United States Patent Office 3,548,002
Patented Dec. 15, 1970

3,548,002
THIOL ALKYLENE AMINES
Leonard Levine, Lake Jackson, Tex., assignor to The Dow Chemical Company, Midland, Mich., a corporation of Delaware
No Drawing. Filed July 10, 1968, Ser. No. 743,590
Int. Cl. C07c 149/00, 149/12, 149/24
U.S. Cl. 260—583       8 Claims

ABSTRACT OF THE DISCLOSURE

Compounds are the reaction products of polyamines with episulfides of the formula $$R'-CH\underset{S}{\overset{}{\diagdown\diagup}}CH-R''$$

wherein R' is H or an alkyl, aryl or aralkyl group of 1 to about 10 carbon atoms, and R" is H or, in combination with R', forms a cycloalkyl group of 5 or 6 carbon atoms. These compounds are useful as curing agents for epoxy resins and have demonstrated biological activity.

SUMMARY OF THE INVENTION

The instant invention is the reaction products of polyamines and episulfides. These compounds have been found to be useful as curing agents for epoxy resins, resulting in non-blushing films, and have also demonstrated biological activity.

The amines which are suitable for making the compounds of this invention are such as alkylene amines, like ethylenediamine, diethylenetriamine and triethylenetetramine; polyalkyleneimines of up to about 100,000 molecular weight; and polyalkylenepolyamines of molecular weight of up to about 100,000.

Polyalkyleneimines are generally made by the polymerization of alkyleneimines, such processes being well known to those skilled in the art. Long-chained polyalkylenepolyamines can be made by processes such as reaction of, for instance, low molecular weight polyalkylenepolyamines with alkylene dihalides.

The episulfides which are suitable for this invention are those of the formula $$R'-CH\underset{S}{\overset{}{\diagdown\diagup}}CH-R''$$

wherein R' is H or an alkyl, aryl or aralkyl group of from 1 to about 10 carbon atoms, and R" is H or, in combination with R', forms a cycloalkyl group of 5 or 6 carbon atoms. Such compounds are, for instance, ethylene sulfide, propylene sulfide, butylene sulfide, styrene sulfide and cyclohexene sulfide.

The reaction is suitably carried on at from about 25° to 200° C., and is preferably from about 40° to 120° C. Pressure is not a critical factor, and is preferably atmospheric or the autogenous pressure.

The mole ratio of amine/episulfide is determined by the degree of substitution desired. Suitably the weight ratio of episulfide to amine can vary from 0.1/1 to 10/1. Preferably the ratio is 0.25/1 to 3/1.

The novel products of this invention have two unexpected utilities. First, an epoxy resin cured with one or more of the products of this invention forms a film which does not "blush" during curing. This is contrary to the case of the same resin cured with a polyamine or an amine-epoxide analog, those films being prone to blush.

Secondly, the products of this invention show unexpected activity as bacteriocides, herbicides and fungicides, in contrast to little or no activity shown by their oxygen analogs.

For instance, the reaction product of ethylenediamine and propylene sulfide shows good growth inhibition and/or killing ability as a bacteriocide, fungicide or herbicide, while the oxygen analog, i.e., the reaction product of ethylenediamine and propylene oxide, shows little or no such activity.

SPECIFIC EMBODIMENTS

The following are examples of the preparation of the products of this invention, and their utility as curing agents:

EXAMPLE 1

One liter of toluene and 300 grams (5 moles) of ethylenediamine (EDA) which had been dried over potassium hydroxide were placed in a flask equipped with a stirrer, pressure-equalizing dropping funnel, thermometer, and a reflux condenser protected with a drying tube. The solution was maintained at 100–105° C. during the dropwise addition of 148 grams (2 moles) of propylene sulfide (PS). The addition required 4 hours and then was maintained at 100–105° C. for an additional hour. Most of the toluene was removed by distillation at atmospheric pressure. The residue was filtered to remove some insoluble material and then partially distilled at reduced pressure. This yielded 118 grams (44% of the theoretical yield) of crude distillate mainly at 80° to 84° C./6 mm., $n_D^{25}$ 1.527.

Analysis.—Calculated for $C_5H_{14}N_2S$ (percent): N, 20.9; S, 23.9. Found (percent): N, 22.2; S, 21.2.

Spectral data indicated a structure with 1 EDA unit to 1 PS unit.

There was 95 g. of residue which was filtered to remove a trace of insoluble solid.

Analysis.—Calculated for $C_{11}H_{26}N_2S_3$ (percent): N, 9.9; S, 34.0. Found (percent): N, 8.9; S, 33.5.

Spectral data indicated a structure with 1 EDA unit to 3 PS units.

EXAMPLE 2

To a flask equipped with a pressure equalizing dropping funnel, thermometer, stirrer and short distillation head were added 206 grams (2.0 moles, dried over sodium hydroxide) of diethylenetriamine (DETA) and 1 liter of toluene. The contents were heated and 150 ml. of the toluene was distilled in order to remove traces of moisture. The distillation head was replaced by a reflux condenser and 148 grams (2.0 moles) propylene sulfide (PS) was added dropwise to the stirred solution at 100–105° C. over a 4 hour period. After completing the addition, the solution was refluxed for 2 hours. The reaction mixture was then stripped of volatiles by heating to 103° C./1 mm.; there was 255 grams of residue. Thirty-five grams of the mixture was removed for spectrographic examination. The remaining residue was further heated to 195° C./0.5–1.0 mm. There was 111 grams of residue which had the following.

Analysis.—Calculated for $C_{16}H_{37}N_3S_4$ (percent): N, 10.5; S, 32.1. Found (percent): N, 11.05; S, 31.14.

Spectral data indicated a structure with 1 DETA unit to 4 PS units.

EXAMPLE 3

One liter of toluene and 180 grams (1.75 moles) of diethylenetriamine (DETA), which had been dried over potassium hydroxide, were placed in a flask equipped as in Example 2. The solution was heated and 150 ml. of toluene removed by distillation. The distillation head was then replaced by a reflux condenser.

A solution of 69 grams (0.93 mole) of propylene sulfide (PS) and 75 ml. of toluene was added dropwise over about 4 hours at 100°–105° C. The solution was then maintained for an additional 4 hours at 100°–105° C. after the addition was complete. The toluene was then removed by distillation at reduced pressure, and vacuum distillation gave a 40% yield of crude product. A middle cut distilled at 102–106° C./0.5 mm.

*Analysis.*—Calculated for $C_7H_{19}N_3S$ (percent): N, 23.7; S, 18.1. Found (percent): N, 23.1; S, 17.4.

Spectral data indicated a structure with 1 DETA unit to 1 PS unit.

EXAMPLE 4

To a solution of 103 grams (1.0 mole) of diethylenetriamine (DETA) and 140 ml. of toluene, was added all at once, 37 gm. (0.5 mole) of propylene sulfide (PS). After several minutes, the temperature of the solution had increased to 45° C.

The solution was allowed to stand for several hours and then stripped of volatiles. The residue was finally heated to 165° C./0.2 mm. There was 27 grams of yellow liquid residue, which had the following.

*Analysis.*—Calculated for $C_{19}H_{43}N_3S_5$ (percent): N, 8.9; S, 33.8; $NH_2$, 2.96; SH, 6.98. Found (percent): N, 8.4; S, 33.6; $NH_2$, 3.55; SH, 5.6.

Spectral data indicated a structure with 1 DETA unit to 5 PS units.

EXAMPLE 5

To a flask equipped with a stirrer, thermometer, dropping funnel and short distillation head were added three liters of toluene and 740 grams (5.1 moles) of triethylenetetraamine (TETA). The solution was heated until 300 ml. of liquid had distilled. The distillation head was removed and a reflux condenser installed. Then 230 grams (3.1 moles) of propylene sulfide (PS) was added dropwise with stirring at 105–115° C. over a 5 hour period. The solution was maintained at 110–115° C. overnight. Most of the toluene was then removed by distillation at atmospheric pressure. The residue was finally stripped in a rotary evaporator in a 140–160° C. bath at 0.3 mm. pressure to remove toluene and excess TETA. There was 313 grams of residue which had the following.

*Analysis.*—Calculated for $C_{15}H_{36}N_4S_3$ (percent): N, 15.2; S, 26.1. Found (percent): N, 14.6; S, 26.5.

Spectral data indicated a structure with 1 TETA unit to 3 PS units.

EXAMPLE 6

To a flask equipped with a stirrer, thermometer and $H_2O$ cooled condenser were added 100 grams $H_2O$, 100 grams dioxane and 34.4 grams (0.2 equivalents of primary amine) of anhydrous polyethyleneimine (approximately 600 molecular weight). The mixture was heated to 43.5° C. and then 14.8 grams (0.2 equivalent) propylene sulfide was added over a 25 minute period, the exotherm carrying the temperature to 54° C. The solution was stirred while the temperature subsided to 35° C. (1½ hours), then heated 30 minutes at 55° C. and cooled. Upon removing all the solvents, 50 grams of a light orange, viscous liquid remained. Further removal of $H_2O$ (1 hour) yielded 48.5 grams of material. Titration with $N/10$ $H_2SO_4$ gave an equivalent weight of 60 (theory=61.5) using methyl red.

EXAMPLE 7

Into a flask equipped with a stirrer, $H_2O$ condenser, thermometer and dropping funnel was placed 172 grams of polyethyleneimine of average molecular weight 300 (approximately 25% primary amine). Next 250 grams dioxane was added in small portions, with stirring, resulting in a clear yellow solution.

74 grams of propylene sulfide was added in a dropwise manner for 1 hour 10 minutes, the resulting exotherm raising the temperature to a maximum of 46° C. The mixture was then heated to 60–65° C. for a period of 3 hours 10 minutes.

The resulting solution was devolatilized at reduced pressure in a steam bath for 3.5 hours, and the residue weighed 244.4 grams.

Analysis showed 3.85% SH and 12.41% S.

EXAMPLE 8

To 28.7 g. of solution of polyepoxide, which was the reaction product of the diglycidyl ether of bisphenol A and glycerol, with an epoxy equivalent weight of 475–575 (75% in acetone), 3.5 grams of the second residue of Example 1, and 32 grams of ethylene glycol monoethyl ether acetate was prepared. Then three phosphatized steel panels were coated with this solution using a wire wound rod such that when dried, the coating was about 1 mil thick. One panel was cured at 105–110° C. for 20 minutes, another panel was cured at 105–110° C. for 60 minutes and another panel was allowed to air-dry for 8 days.

The heat-cured panels formed coatings which passed the 30 inch-pound impact test (forward and reverse) and the ⅛" conical and mandrel bend test. The panel that was cured for 20 minutes failed the acetone solvent test within one minute, but passed the xylene solvent test after 120 minutes. The panel that was cured for 60 minutes passed the acetone solvent test at 3 minutes, but failed at 6 minutes. It was still passing the xylene solvent test after 220 minutes.

The air cured panel passed the 30 in.-lb. impact test both forward and reverse and the ⅛" conical mandrel bend test. It failed the acetone solvent test in 1 minute, but was still passing the xylene solvent test after 120 minutes. The solvent tests were conducted by placing 1" x 1" absorbent pads saturated with the solvent onto the surface of the panel and at periodic intervals removing the saturated absorbent pad and rubbing the surface with the tip of a wooden tongue depressor.

EXAMPLE 9

In an aluminum weighing dish was well mixed 10 grams of the diglycidyl ether of bisphenol A having an epoxy equivalent weight of 186–192, and 1.75 grams of the first residue of Example 1. The temperature of the mixture rose to 31° C. and then remained steady during several minutes of stirring. The mixture was then warmed on a hot plate. In a short time, a vigorous exotherm began and the mixture was removed from the hot plate. On standing, a hard, yellow solid resulted.

The reaction was repeated with the same quantities of reagents. The mixture was stirred for 10 minutes and then allowed to stand at room temperature overnight. The product was a hard, brittle, clear yellow solid which did not melt when heated on a hot plate (200° C.).

EXAMPLE 10

To 57.4 grams of the solid polyepoxide described in Example 8 (75% in acetone) was added 65 grams of ethylene glycol monoethyl ether acetate and 8.0 grams of the product from Example 2. The mixture was shaken until a clear solution was obtained. The solution was then applied to phosphatized steel panels. The film was about 1 mill thick when dried. After standing 30 min., one panel was cured in a 105° C. oven for 20 min. and another was cured for 90 min. at 105° C.

Both panels passed the 30 in.-lb. impact test, both forward and reverse, and the ⅛" conical mandrel bend test. Both panels also passed the xylene solvent test at 180 min. The 20 min. cured panel failed the acetone solvent test in 1 min. and the 90 min. cured panel passed the acetone test at 5 min. but failed at 7 min.

EXAMPLE 11

To 6.1 grams of the product from Example 5 was added 57.4 grams of the solid polyepoxide described in Example 8 (75% in acetone) and 63 grams of ethylene glycol monoethyl ether acetate. The contents were mixed until a clear solution was obtained. Then four phosphatized steel panels were coated with the solution using a wire wound rod. The film was about 1 mil thick when dry. Two of the panels were air-dried for 1 week. One panel was cured 20 minutes in a 105–110° C. oven and the last panel was cured for 1 hour in the same oven.

Both of the heat-cured panels passed the 30 in.-lb. impact test, both forward and reverse, and the 1/8" conical mandrel bend test. The panel that was cured for 20 minutes passed the acetone and xylene solvent test at room temperature after 20 minutes exposure, but failed the acetone test after 24 minutes exposure. The panel that was cured for 1 hour passed the acetone solvent test at 21 minutes, but failed at 27 minutes. It passed the xylene test at 40 minutes, but failed after 83 minutes exposure. The air dried panels failed the acetone test after 1 minute exposure and were still resisting xylene after 150 minutes exposure. They passed a 30 in.-lb. impact test, both forward and reverse, and also passed the 1/8" conical mandrel bend test after only 4 days of air drying.

while 0% indicates the treated plants were no different than the controls.

The results are contained in Table I below:

TABLE I

| No. | Product[1] | Organism tested | Conc. | Percent control |
|---|---|---|---|---|
| 1 | 1 and 2 | Apple scab | 25 p.p.m | 50 |
| 2 | 2 | Paint mildew | 100 p.p.m | 100 |
| 3 | 4 | Tomato late blight | 400 p.p.m | 50 |
| 4 | 4 | Lettuce downy mildew | 400 p.p.m | 75 |
| 5 | 2 and 3 | Staphylococous aureus | 100 p.p.m | 100 |
| 6 | 3 | Escherichia coli | 100 p.p.m | 100 |
| 7 | 4 | Candida albicans | 500 p.p.m | 100 |
| 8 | 2 | Trichophton mentagrophytes | 500 p.p.m | 100 |
| 9 | 2 and 4 | Bacillus subtilis | 500 p.p.m | 100 |
| 10 | 1 and 3 | Bacillus subtilis | 500 p.p.m | 50 |
| 11 | 2 | Aerobacter aerogenes | 100 p.p.m | 50 |
| 12 | 2 | Salmonella typhosa | 500 p.p.m | 100 |
| 13 | 1 and 3 | Salmonella typhosa | 500 p.p.m | 50 |
| 14 | 3 | Psuedomonas aroginooa | 100 p.p.m | 100 |
| 15 | 2 | Aspergillus terreus | 100 p.p.m | 100 |
| 16 | 2 | Candida pelliculosa | 500 p.p.m | 50 |
| 17 | 2 | Pullularia pullulans | 100 p.p.m | 100 |
| 18 | 4 | Spiny clotburs | 4,000 p.p.m | 100 |
| 19 | 4 | Bean mildew | 4.000 p.p.m | 90 |
| 20 | 1 | Pea | 50 lbs./acre | 100 |
| 21 | 1 | Bindweed | 10 lbs./acre | 50 |
| 22 | 1 | Pig weed | do | 95 |

[1] Product No. 1 is the first product of Example 1; Product No. 2 is the product of Example 2; Product No. 3 is the product of Example 5: and Product No. 4 is the product of Example 6.

EXAMPLE 12

To 1.6 grams of the product of Example 6 was added 3.6 grams of the diglycidyl ether of Example 9. A 0.003" film of the mixture was spread on a tin plated panel and cured at 25° C. After 8 hours the film was non-tacky and somewhat soft. After 16 hours it had a hardness of about a 3H pencil. The film was not affected by a 180° bend around a 1/16" rod, and did not peel when cut across the edge of the bend.

EXAMPLE 13

The bacteriocidal and fungicidal activity of the products of this invention were established by in vitro tests. The compounds to be tested were diluted in an appropriate solvent, and then diluted to the indicated concentration in warm melted agar. The agar was then poured into petri dishes, and the agar allowed to solidify.

Droplets of the test organism were placed on the media, and the dishes incubated at an appropriate temperature for a suitable time. Percent activity was noted as follows: No growth (kill)—100%, reduced growth (inhibition)—50%. Control dishes with no compound added were also incubated in the same way. Also, in the case of "Apple Scab," the test compound was placed directly on the plant, which was then infected with the pathogen.

Herbicidal activity was determined by pre-emergence or post-emergence tests. The test materials were diluted in a suitable solvent and then either placed in soil with the proper seeds or placed directly on the plants, in the indicated concentrations. 100% indicates complete control, Other products within the invention that can be made by the above general procedures and that are useful for the same purposes include the reaction product of ethylenediamine with styrene sulfide, dipropylenetriamine with butylene sulfide, tributylenetetraamine with ethylene sulfide, polyalkylenepolyamines of up to about 100,000 molecular weight with cyclohexene sulfide.

I claim:
1. The reaction product of:
   (a) one part by weight of an alkyleneamine, a polyalkyleneimine or a polyalkylenepolyamine of molecular weight up to about 100,000; and
   (b) 0.1 to 10 parts by weight of one of the episulfides of the formula

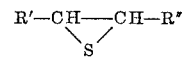

wherein R' is H or an alkyl group of from 1 to 10 carbon atoms, and R" is H or, in combination with R', forms a cycloalkyl group of 5 to 6 carbon atoms.

2. The product of claim 1 wherein (a) is ethylenediamine.

3. The product of claim 1 wherein (a) is diethylenetriamine.

4. The product of claim 1 wherein (a) is triethylenetetraamine.

5. The product of claim 1 wherein (a) is a polyethyleneimine of about 600 molecular weight.

6. The product of claim 1 wherein (a) is a polyethyleneimine of about 300 molecular weight.

7. The product of claim 1 wherein (b) is propylene sulfide.

8. The product of claim 1 wherein the weight ratio of episulfide to amine is 0.25/1 to 3/1.

References Cited

Braz: Journal of General Chemistry, USSR vol. 21 pp. 688–693 (1951).

CHARLES B. PARKER, Primary Examiner

R. L. RAYMOND, Assistant Examiner

U.S. Cl. X.R.

71—98; 260—2, 563, 570.5; 424—325